US009141865B2

(12) United States Patent
Erukhimov

(10) Patent No.: US 9,141,865 B2
(45) Date of Patent: Sep. 22, 2015

(54) FAST SINGLE-PASS INTEREST OPERATOR FOR TEXT AND OBJECT DETECTION

(71) Applicant: Victor Erukhimov, Moscow (RU)

(72) Inventor: Victor Erukhimov, Moscow (RU)

(73) Assignee: Itseez, Inc., San Francisco, CA (US)

( * ) Notice: Subject to any disclaimer, the term of this patent is extended or adjusted under 35 U.S.C. 154(b) by 0 days.

(21) Appl. No.: 14/325,522

(22) Filed: Jul. 8, 2014

(65) Prior Publication Data

US 2015/0117780 A1 Apr. 30, 2015

Related U.S. Application Data

(60) Provisional application No. 61/896,275, filed on Oct. 28, 2013.

(51) Int. Cl.
*G06K 9/18* (2006.01)
*G06K 9/00* (2006.01)

(52) U.S. Cl.
CPC .............. *G06K 9/18* (2013.01); *G06K 9/00818* (2013.01)

(58) Field of Classification Search
CPC ............................. G06K 9/18; G06K 9/00818
USPC ................... 382/182, 162, 171, 181, 320; 348/240.99
See application file for complete search history.

(56) References Cited

U.S. PATENT DOCUMENTS

2014/0168478 A1\* 6/2014 Baheti et al. ............. 348/240.99

OTHER PUBLICATIONS

S. Houben, et al., Detection of Traffic Signs in Real-World Images: The German Traffic Sign Detection Benchmark, International Joint Conference on Neural Networks 2013.
A. Broggi, P. Cerri, P. Medici, P. P. Porta, and G. Ghisio, "Real time road signs recognition," in Proceedings of the IEEE Intelligent Vehicles Symposium, 2007, pp. 981-986.
C. Bahlmann, Y., V. Ramesh, M. Pellkofer, and T. Koehler, "A system for traffic sign detection, tracking, and recognition using color, shape, and motion information," in Proceedings of the IEEE Intelligent Vehicles Symposium, 2005, pp. 255-260.
A. Ruta, Y. Li, and X. Liu, "Real-time traffic sign recognition from video by class-specific discriminative features," Pattern Recognition, vol. 43, pp. 416-430, 2010.
I. Breiman "Random forests," Machine learning 45.1 (2001): 5-32.

\* cited by examiner

*Primary Examiner* — Mike Rahmjoo
(74) *Attorney, Agent, or Firm* — VLP Law Group LLP; Kent H. Cheng

(57) ABSTRACT

The invention provides a method of using machine vision to recognize text and symbols, and more particularly traffic signs.

4 Claims, 1 Drawing Sheet

Example of W + classification filter output

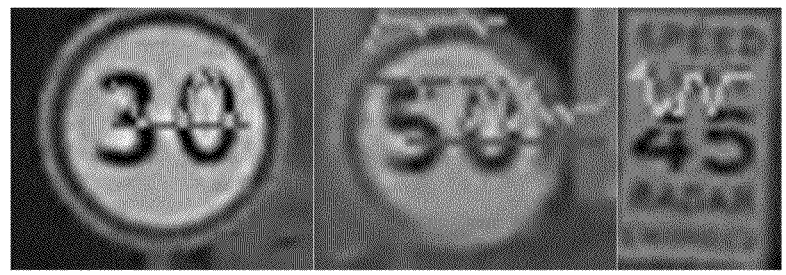
Figure 1. W filter for speed limit signs
Figure 2 Example of W filter output
Figure 3 Example of W + classification filter output

FAST SINGLE-PASS INTEREST OPERATOR FOR TEXT AND OBJECT DETECTION

CROSS REFERENCE TO RELATED APPLICATIONS

This application claims the benefit of U.S. Provisional Application No. 61/896,275, filed Oct. 28, 2013.

BACKGROUND OF THE INVENTION

1. Field of the Invention

Computer recognition of text and symbols, including the recognition of traffic signs.

2. Description of the Related Art

I have been working on the problem of recognizing traffic signs seen by a camera installed behind a windshield of a car. The main application is an automotive system ADAS (advanced driver assistance system) that helps a driver make decisions. For example, it can show the current speed limit together with the current speed, it can warn a driver about approaching stop, school, pedestrian crossing and other warning signs. It is important for the automotive industry that ADAS algorithms work on low power computing hardware. There are many algorithms for recognizing traffic signs that use shape and color features to recognize the signs, but the number of operations needed to find these features in an image is large and the resulting detection algorithms are slow. The goal of this research was to find a detection algorithm that would pick only a few areas that look like text or a traffic symbol, and do it within a very small amount of time.

SUMMARY OF THE INVENTION

The algorithm used in the present invention aims to select areas in an image that look like text or traffic symbol by looking at each image scanline independently. The core of the algorithm is a feature filter that looks for a certain combination of pixel intensity features along a scanline. For example, if we denote a maximum by ∧ and a minimum by ∨, the target sequence is ∨∧∨∧∨. This sequence appears to be distinctive enough to find almost all scanline areas in an image that contain text or traffic symbol and return few false positives that can be removed by further post-processing. The sequence is distinctive even when the text or traffic symbol is viewed at an angle. The algorithm is very efficient for many hardware architectures, because it is scalable and memory efficient.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 1 depicts the W filter for speed limit signs.

FIG. 2 shows an example of a W filter output

FIG. 3 shows an example of the W+ classification filter output

DETAILED DESCRIPTION OF THE PRESENTLY PREFERRED EMBODIMENTS

Specifically, I have been working on the problem of recognizing traffic signs seen by a camera installed behind a windshield of a car. The main application is an automotive system ADAS (advanced driver assistance system) that helps a driver make decisions. For example, it can show the current speed limit together with the current speed, it can warn a driver about approaching stop, school, pedestrian crossing and other warning signs. It is important for the automotive industry that ADAS algorithms work on low power computing hardware. There are many algorithms for recognizing traffic signs (see, for example, [1] Detection of Traffic Signs in Real-World Images: The German Traffic Sign Detection Benchmark, IJCNN 2013; [2] A. Broggi, P. Cerri, P. Medici, P. P. Porta, and G. Ghisio, "Real time road signs recognition," in Proceedings of the IEEE Intelligent Vehicles Symposium, 2007, pp. 981-986; [3] C. Bahlmann, Y., V. Ramesh, M. Pellkofer, and T. Koehler, "A system for traffic sign detection, tracking, and recognition using color, shape, and motion information," in Proceedings of the IEEE Intelligent Vehicles Symposium, 2005, pp. 255-260; and [4] A. Ruta, Y. Li, and X. Liu, "Real-time traffic sign recognition from video by class-specific discriminative features," Pattern Recognition, vol. 43, pp. 416-430, 2010, that use shape and color features to recognize the signs, but the number of operations needed to find these features in an image is large and the resulting detection algorithms are slow. The goal of this research was to find a detection algorithm that would pick only a few areas that look like text, and do it within a very small amount of time.

The algorithm that defines the W filter iterates through all scanlines of an image and detects if a scanline crosses an object of interest. The outline of the algorithm is as follows:

a. For each scanline I
  i. For each pixel p in I
    1. If the pixel neighborhood of p contains a feature f(p), then add f(p) to the list of features L. In the case of extremum, the neighborhood is of size 3 (pixel p and the neighboring pixels).
    2. If the current list of features satisfies the condition C(L), add the pixel p coordinates and the size of the neighborhood (returned by C(L)) to the output list O. The neighborhood here is a sequence of pixels spanned by the sequence of features satisfying the condition C(L). The size of the neighborhood satisfying the condition C(L) is the number of pixels in the neighborhood.
b. Return the list of pixels and sizes of the corresponding neighborhoods O This algorithm has two subroutines: f(p) and C(L). An example of a feature f(p) is a local extremum (maximum or minimum). An example of the condition C(L) is the combination of minima and maxima (∨∧∨∧∨), with the neighborhood spanning all pixels starting from the leftmost minimum till the rightmost minimum.

FIG. 1 illustrates the algorithm, showing a scanline crossing text in speed limit signs, with pixel grey-scale intensity depending on the x-coordinate being plotted in the same image by a green curve.

f(p) may be any feature that indicates the presence of an object, such as a traffic sign. For example, we can use extrema as features. f(p) is present in the pixel p if the following condition is met: $I(x) \geq \max(I(x-1), I(x+1))$ OR $I(x) \leq \min(I(x-1), I(x+1))$, where x is pixel coordinate and I(x) is the intensity in a pixel with coordinate x. Extremum is not the only feature that can be used. We can also use large gradients (abs(I(x−1)+I(x+1))>threshold) and other features computed from pixel p local neighborhood.

A condition can be a sequence of maxima and minima ∨ ∧ ∨ ∧ ∨ such that the distance between the leftmost and the rightmost minima is smaller than the threshold t. The threshold is a parameter of the algorithm that depends on the specific problem and image resolution. For traffic sign recognition we use t=20 for VGA resolution (640×480), scaling it proportionally to the image width. As features can be different, a feature is written in the list L as a category (in the extremum case category is binary—either maximum or minimum), while C(L) searches for a specific sequence of categories in the list L (as substring search), and checks for the substring span interval in pixels.

The W filter returns a few false positive areas (see FIG. 2 for examples). However, the number of false positive areas can be reduced by a post-processing classification algorithm. We used a random forest classifier that used intensity values as features. Such a random forest classifier is disclosed in Breiman, Leo. "Random forests" Machine Learning 45.1 (2001): 5-32. Each neighborhood was scaled to the same number of pixels to have the same number of features. The classifier was trained on a set of positive (scanline areas that cross a sign) and negative (scanlines that don't cross any sign) examples. The classifier is executed on each sample returned by W filter and returns a binary value. As one can see from FIG. 3, even after that there are false alarms. However since the number of false alarms is small (on our dataset W+ classification returns about 6% of the original image area), the geometry and color cues can be used to filter them out without significant performance degradation. Examples of post-processing classification algorithms to further filter out false positives by using geometry and color cues are disclosed in German Traffic Sign Recognition Benchmark, which contains a review of various state of the art methods. See J. Stallkamp, M. Schlipsing, J. Salmen, C. Igel, Man vs. Computer: Benchmarking machine learning algorithms for traffic sign recognition, Neural Networks, Available online 20 Feb. 2012, ISSN 0893-6080, 10.1016/j.neunet.2012.02.016. (http://www.sciencedirect.com/science/article/pii/S0893608012000457)

Our implementation of the traffic sign detection algorithm supporting speed limit signs and stop signs works in real time on Nexus 4 mobile phone.

The detection result of the W filter will depend on the dynamic range of the camera and the shrinking interpolation method. For the dataset that we have captured with mobile phone cameras with 8 bits per pixel dynamic range we are detecting US signs starting with 30 pixels sign width (although we have seen detections with lower sign width).

As for the full algorithm, the traffic sign recognition system runs on 1280×720 resolution or higher, but the W filter is executed for an image that is shrinked to the height of 360.

The main novelty is the W filter that selects a few image areas based just on a single scanline. It allows much faster processing than the prior art. Another novelty is a particular implementation of this algorithm that uses image extrema as features and looks for W sequence of extremums.

The invention is not limited by the embodiments described above which are presented as examples only but can be modified in various ways within the scope of protection defined by the appended patent claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method for recognizing an object in an image of an area, the method comprising: retrieving image data captured by an imaging device, the image data corresponding to the image of the area and having a plurality of scanlines wherein each scanline has a pixel neighborhood of p; and executing a W filter on at least a portion of the plurality of scanlines to detect the object,
    wherein the W filter comprises two subroutines: f(p) and C(L) whereby
    if the pixel neighborhood of p in one scanline contains a feature f(p), then add f(p) to a list of features L; and
    if the list of features L satisfies the condition C(L), then add the coordinates and a size of the pixel neighborhood of p returned by C(L) to an output list O that characterizes the object.

2. The method of claim 1 further comprising a step of reducing a number of false identification of the object by executing a post-processing classification algorithm.

3. The method of claim 1 further comprising a step of reducing the resolution of the image data before executing the W filter.

4. The method of claim 1, wherein the feature f(p) is selected from the group consisting of extrema and large gradients.

* * * * *